United States Patent [19]
Ray

[11] Patent Number: 6,138,503
[45] Date of Patent: *Oct. 31, 2000

[54] SCANNING PROBE MICROSCOPE SYSTEM INCLUDING REMOVABLE PROBE SENSOR ASSEMBLY

[75] Inventor: David J. Ray, Agoura Hills, Calif.

[73] Assignee: RayMax Technology, Inc., Agoura Hills, Calif.

[*] Notice: This patent is subject to a terminal disclaimer.

[21] Appl. No.: 09/253,462

[22] Filed: Feb. 19, 1999

Related U.S. Application Data

[63] Continuation-in-part of application No. 08/951,365, Oct. 16, 1997, Pat. No. 5,874,669.

[51] Int. Cl.$^7$ .............................. G01B 5/28; G01B 7/34

[52] U.S. Cl. ............................................. 73/105

[58] Field of Search ............................. 73/105; 250/306

[56] References Cited

U.S. PATENT DOCUMENTS

| | | |
|---|---|---|
| Re. 34,489 | 12/1993 | Hansma . |
| Re. 35,514 | 5/1997 | Albrecht et al. .................. 250/216 |
| 4,935,634 | 6/1990 | Hansman et al. . |
| 5,025,658 | 6/1991 | Elings et al. . |
| 5,144,833 | 9/1992 | Amer et al. . |
| 5,189,906 | 3/1993 | Elings et al. . |
| 5,231,286 | 7/1993 | Kajimura et al. . |
| 5,245,863 | 9/1993 | Kajimura et al. . |
| 5,260,824 | 11/1993 | Okada et al. . |
| 5,388,452 | 2/1995 | Harp et al. .................. 73/105 |
| 5,394,741 | 3/1995 | Kajimura et al. . |
| 5,406,833 | 4/1995 | Yamamoto .................. 73/105 |
| 5,440,920 | 8/1995 | Jung et al. .................. 73/105 |
| 5,463,897 | 11/1995 | Prater et al. .................. 73/105 |
| 5,481,908 | 1/1996 | Gamble et al. .................. 73/105 |

(List continued on next page.)

OTHER PUBLICATIONS

Y. Martin et al., "Atomic Force Microscope–Force Mapping and Profiling On a Sub 100A Scale", J. Appl. Phys., vol. 61, No. 10, May 15, 1987, pp. 4723–4729.

D. R. Baselt et al., "Scanned Cantilever Atomic Force Microscope", Rev. Sci. Instrum., vol. 64, No. 04, Apr. 1993, pp. 908–911.

K. O. van der Werf et al., "Compact Stand–Alone Atomic Force Microscope", Rev. Sci. Instrum., vol. 64, No. 10, Oct. 1993, pp. 2892–2897.

S. M. Clark et al., "A High Performance Scanning Force Microscope Head Design", Rev. Sci. Instrum., vol. 64, No. 04, Apr. 1993, pp. 904–907.

B. Gasser et al., "Design of a 'Beetle–Type' Atomic Force Microscope Using the Beam Deflection Technique", Rev. Sci. Instrum., vol. 67, No. 05, May 1996, pp. 1925–1929.

IBM Technical Disclosure Bulletin, vol. 30, No. 6, Nov. 1987, Force Measurement With High Sensitivity Application to Surface Inspection at the Angstrom Scale.

P.S. Jung et al., "Novel Stationary–Sample Atomic orce Microscope with Beam–Tracking Lens", Electronics Letters, Feb. 4, 1993, vol. 29, No. 3, pp. 264–265.

*Primary Examiner*—Daniel S. Larkin
*Attorney, Agent, or Firm*—Small Larkin, LLP

[57] ABSTRACT

A scanning force microscope system that employs a laser (76) and a probe assembly (24) mounted in a removable probe illuminator assembly (22), that is mounted to the moving portion of a scanning mechanism. The probe illuminator assembly may be removed from the microscope to permit alignment of said laser beam onto a cantilever (30) after removal. This prevents damage to, and shortens alignment time of, the microscope during replacement and alignment of the probe assembly. The scanning probe microscope assembly (240) supports a scanning probe microscope (244). Scanning probe microscope (244) holds a removable probe sensor assembly (242). Removable probe sensor assembly (242) may be transported and conveniently attached to the adjustment station (250) where the probe sensor assembly parameters may be observed and adjusted if necessary. The probe sensor assembly (242) may then be attached to the scanning probe microscope (244).

15 Claims, 11 Drawing Sheets

U.S. PATENT DOCUMENTS

| | | | |
|---|---|---|---|
| 5,496,999 | 3/1996 | Linker et al. | |
| 5,524,479 | 6/1996 | Harp et al. | 73/105 |
| 5,560,244 | 10/1996 | Prater et al. | 73/105 |
| 5,569,918 | 10/1996 | Wang | 250/306 |
| 5,587,523 | 12/1996 | Jung et al. | 73/105 |
| 5,625,142 | 4/1997 | Gamble | 73/105 |
| 5,705,814 | 1/1998 | Young et al. | 250/306 |
| 5,808,977 | 9/1998 | Koyanagi et al. | 250/306 X |
| 5,811,802 | 9/1998 | Gamble | 250/306 |
| 5,847,383 | 12/1998 | Tong | 250/306 X |
| 5,850,038 | 12/1998 | Ue | 73/105 |
| 5,861,550 | 1/1999 | Ray | 73/105 |
| 5,874,669 | 2/1999 | Ray | 73/105 |

SCANNING PROBE MICROSCOPE SYSTEM INCLUDING REMOVABLE PROBE SENSOR ASSEMBLY

CROSS REFERENCE TO RELATED APPLICATIONS

This is a continuation-in-part of application Ser. No. 08/951,365, now U.S. Pat. No. 5,874,669 filed Oct. 16, 1997.

BACKGROUND OF THE INVENTION

A. Field of the Invention

The present invention relates to the field of scanning probe microscopes, including those which use light beam detection schemes.

B. Description of the Prior Art

Scanning force microscopes, also referred to as atomic force microscopes, can resolve features of matter to the atomic level, i.e., determine features measured to an accuracy of + or −0.10 Angstrom. Scanning force microscopes are members of a class of a broader category of microscope known as scanning probe microscopes. As is commonly known, scanning probe microscopes use a probe that senses some parameter of a sample, such as height, or magnetic field strength. A sensor will typically monitor a parameter of the probe, such as vertical displacement. Scanning probe microscopes include scanning tunneling microscopes, scanning force microscopes, scanning capacitance microscopes, scanning thermal microscopes, and other type of probe microscopes, as is well known.

When used to image the topography of a sample, the scanning force microscope uses a finely pointed stylus to interact with a sample surface. Scanning force microscopes are typically used to measure the topography of recording media, polished glass, deposited thin films, polished metals, and silicon in preparation for integration into semiconductors. A scanning mechanism in the microscope creates relative motion between the stylus and the sample surface. When a measurement of the interaction of the stylus and surface is made, the surface topography of the sample can be imaged in height as well as in the lateral dimensions. Other classes of probe microscopes may use different types of probes to measure sample features other than topography. For example, the interaction of a magnetic probe with the sample may create an image of the magnetic domains of the sample. Scanning tunneling microscopes use a conductor with a sharp point and a small bias voltage to sense a sample surface, which is then used to form an image of charge density.

Scanning force microscopes typically have the stylus mounted orthogonally to the longer dimension of a cantilever. A cantilever is a lever constrained on one end, with the other end free to move. The stylus is attached to the free end, and the cantilever will, therefore, deflect, or bend, when forces are applied to the stylus. In force microscopes, the forces acting on the stylus are the result of the interaction of the stylus with the sample surface. The combination of a stylus, cantilever, and inseparable cantilever supporting elements is referred to as a probe assembly. The cantilever, as used in a scanning force microscope, typically has a very weak cantilever force constant, and deflects or bends noticeably when forces as small as one nanonewton are applied to the free end. Typical cantilever force constant values for such cantilevers are in the range of 0.01 N/m to 48 N/m, where N is in Newtons and m is in meters. A detection mechanism is operatively connected to provide a signal proportional to cantilever deflection. This signal is then processed by a feedback loop to create a feedback signal which in turn dives a vertical drive mechanism. The vertical drive mechanism moves the fixed end of the cantilever toward and away from the sample surface. This vertical drive mechanism maintains the free end of the cantilever surface at a nearly constant bend angle, as detected by the detection mechanism, through movement of the probe assembly in proportion to the magnitude of the feedback signal.

During scanning operation, a lateral drive mechanism creates relative lateral motion between the stylus and sample. This relative lateral motion between the stylus and the surface creates lateral and vertical forces on the stylus as it interacts with surface features passing under the stylus. The lateral force applies torque to the stylus and cantilever. The vertical force on the stylus causes the cantilever free end to deflect vertically. The known lateral position of the stylus over the sample can be expressed in terms of x and y coordinates. The vertical deflection of the cantilever defines a height or z value. The x and y coordinates create a matrix of z values which describe the surface topography of the sample. The scanning mechanism includes of the vertical and lateral drive mechanisms.

In order to detect and quantify the cantilever deflections, a laser beam is directed onto the free end of the cantilever opposite the surface supporting the stylus. The surface illuminated by the laser beam is at least partially reflecting. By measuring the position of the reflected beam as the lateral drive mechanism operates, the deflection of the free end of the cantilever is determined. Preferably, a vertical array of two conventional light-sensitive devices detects the position of the reflected beam. These devices produce electrical signals that represent the bend angle of the free end of the cantilever. The difference between the two signals created by the two light-sensitive devices is a signal that is proportional to the displacement of the cantilever deflection in the vertical direction. Alternatively, and most preferred, by use of four light-sensitive devices in a quadrant array both the cantilever twist and cantilever vertical deflection can be measured. The vertical drive mechanism receives signals processed from the vertical component of the output of the light-sensitive devices.

In probe microscopes, it is often necessary to replace the probe assembly. This may result from a blunted stylus tip typically caused by wear of, or by small particles that adhere to, the tip as it scans over the sample. Also, the stylus or the cantilever, or both can break, thus necessitating replacement of the probe assembly. When the probe assembly is replaced, the new cantilever often is not in the same position as the previous cantilever, relative to the laser and associated optics. Adjustment of either the laser beam angle or the probe assembly position is then required. Conventional alignment mechanisms restore the beam to its proper position on the reflecting surface of the cantilever.

The initial adjustment of the laser to direct its beam onto the cantilever can be accomplished in various ways. See, for example, U.S. Pat. No. 5,861,550, "Scanning Force Microscope and Method for Beam Detection and Alignment" by Ray, and copending continuation application Ser. No. 09/183,195, by Ray, titled "Scanning Force Microscope and Method for Beam Detection, and copending application, Ser. No. 08/951,365, now U.S. Pat. No. 5,874,669 by Ray titled "Scanning Force Microscope with Removable Probe Illuminator Assembly".

The manufacture of the probe together with its associated stylus, may be accomplished with micro-machining, ion beam milling, or other techniques as are well known. In some instances resulting, the stylus may have an improper shape, such as, for example, an aspect ratio or a nonsymetry that will prevent its use. When such a stylus is used to scan a sample surface, the image obtained would be distorted. Thus, before use, a stylus must be characterized by first scanning a sample of known surface features and then comparing the known features with the image obtained by the stylus. If the stylus has an undesirable shape, the image will not compare favorably with the known sample features and the stylus typically will be rejected in favor of a stylus that provides a favorably comparable image. For the purpose of the present invention, and as is commonly understood in this field, the above-described process is known as stylus or tip characterization.

Known scanning probe microscopes are shown in U.S. Pat. No. 4,935,634 to Hansma et, al, and U.S. Pat. No. 5,144,833 to Amer et, al. These devices move the sample laterally and vertically under a stationary stylus while detecting the cantilever deflection with the laser beam apparatus described above. These microscopes have a disadvantage stemming from the limited force capability of the lateral and vertical drive mechanisms. When the sample weight is great compared to the force created by the drive mechanisms, the sample will then move very slowly or not at all under the stylus. The mechanical resonance of these scanning mechanisms is also undesirably low with large moving mass.

Other known microscopes, as described in U.S. Pat. No. 5,496,999 to Linker et. al. and U.S. Pat. No. RE 35,514 to Albrecht et. al. have removable assemblies comprising laser, cantilever, and adjustment mechanisms mounted to the fixed reference frame of the microscope base. But, these microscopes also have the disadvantage as described above in that they move the sample under the stationary stylus. Further, the assemblies are too massive to be mounted to the lateral and vertical drive mechanisms because they permit adjustment of the beam path or probe position only while the assembly is mounted to the microscope.

Other known microscopes are described in U.S. Pat. No. 5,481,908, and its continuation, U.S. Pat. No. 5,625,142, to Gamble. These microscopes use a stationary sample, but move the laser, the cantilever, and all of the associated mechanisms necessary to make initial adjustment of the laser beam. Because the laser moves with the cantilever, the laser beam follows the motion of the cantilever during scanning. However, the relatively great mass of the moving parts of these microscopes limits the rate of image data collection.

Other known microscopes attempt to overcome the disadvantage of moving the sample by using an interferometric method to track a moving cantilever. These microscopes are described in U.S. Pat. No. 5,025,658, and its continuation, U.S. Pat. No. 5,189,906, to Elings et al. However, this approach suffers from false signals received by the interferometer, as a result of light reflected from the sample surface.

Still other known microscopes use moving beam steering optics with a stationary laser source, as described in U.S. Pat. Nos. 5,524,479, and U.S. Pat. No. 5,388,452, to Harp and Ray; U.S. Pat. No. 5,463,897, and U.S. Pat. No. 5,560, 244, to Prater et al.; and in U.S. Pat. No. 5,440,920, and U.S. Pat. No. 5,587,523 to Jung et. al. These microscopes employ a fixed position laser and optical elements that move in conjunction with the moving probe assembly. As a result of the moving optical elements, the laser beam experiences a refraction such that it more or less follows the reflecting surface of the moving cantilever. However, these microscopes have noticeable deficiencies when the probe assembly must be replaced, because initial alignment of the laser beam through the optics, and onto the newly installed cantilever, are typically time consuming and tedious. As a result, these microscopes do not readily lend themselves to industrial applications.

With these microscopes, it is possible to place a low mass operator controlled adjustment mechanism on the moving end of the drive mechanisms to reposition the probe assembly rather than aligning the laser. The probe assembly then can be aligned with the laser beam. However, the vertical and lateral drive mechanisms often consist of thin walled piezoelectric tubes, and such tubes are quite fragile. The operator may apply too much force when adjusting the probe holding mechanism attached to the tubes, thus damaging or breaking the tubes during the alignment process. Also, this alignment process can also be tedious.

Other known attempts to solve this problem, such as described in U.S. Pat. No. 5,496,999, to Linker et al, use precision mounting of the probe assembly on the microscope. By carefully machining the parts to high tolerances, it is possible to bring the probe into near alignment with the laser light source. This method, however, generally results in higher costs, and normally still results in the need for a final small adjustment of the laser beam or probe position.

Still other attempts to solve this problem, as exemplified in U.S. Pat. No. 5,705,814, rely on systems that move the scanning mechanism into a position relative to the probe assembly using an X, Y translator, a Z translator, and an optical system to detect when the scanning mechanism and the to-be-mounted probe assembly are in alignment. This approach then uses either a vacuum or a mechanical mechanism to capture and hold the probe assembly. These systems are very complex and expensive relative to the invention presented in this application.

OBJECTS AND SUMMARY OF THE INVENTION

The scanning probe microscope system, removable probe sensor assembly, scanning force microscope system, and removable probe illuminator assembly have the following objects, and advantages over the prior art:

(a) the probe illuminator assembly with prealigned laser and probe assembly can be replaced on the microscope and the microscope is ready for immediate operation without tedious alignment of the laser or probe assembly;

(b) the laser and probe compose a probe illuminator assembly that is conveniently removable from the vertical and lateral drive mechanisms in case of failure of the laser;

(c) adjustment of the laser beam is accomplished while the probe illuminator assembly is removed from the microscope thereby preventing damage to the vertical and lateral drive mechanisms during the alignment process;

(d) during scanning the laser beam accurately tracks the motion of the probe assembly;

(e) the removal and replacement of the probe illuminator assembly can be automated;

(f) the stylus may be easily characterized prior to mounting to the microscope;

(g) the removable portion of the microscope may be the probe sensor assembly which is applicable to other classes of probe microscopes; and/or (h) the separate adjustment station can provide monitoring, adjusting, and aligning mechanisms to calibrate the probe sensor assembly.

The scanning probe microscope system, described below has a removable probe sensor assembly that may be characterized by a separate adjustment station.

Also, the scanning force microscope system described below has a low mass laser, such as the model SLD 1122VS made by Sony Electronics, Inc., and a probe assembly mounted in a conveniently removable probe illuminator assembly. The illuminator assembly is connected to the moving portion of the scanning mechanism and is, therefore, in the moving reference frame of the microscope. The laser and probe assembly move as a unit, and the laser beam unerringly tracks the cantilever during scanning. When replacing the probe assembly, the operator easily and conveniently removes the probe illuminator assembly from the microscope. The illuminator assembly is then replaced with a new prealigned illuminator assembly. Further, the probe assembly may be replaced in the just removed illuminator assembly and aligned without damage to the microscope scanning mechanism.

The scanning force microscope system, further includes a separate adjustment station and probe sensor assembly transport holders. This station provides for the alignment, and characterization of the removable probe sensor assembly and its associated components.

DESCRIPTION OF THE PREFERRED EMBODIMENTS

Figure 1:
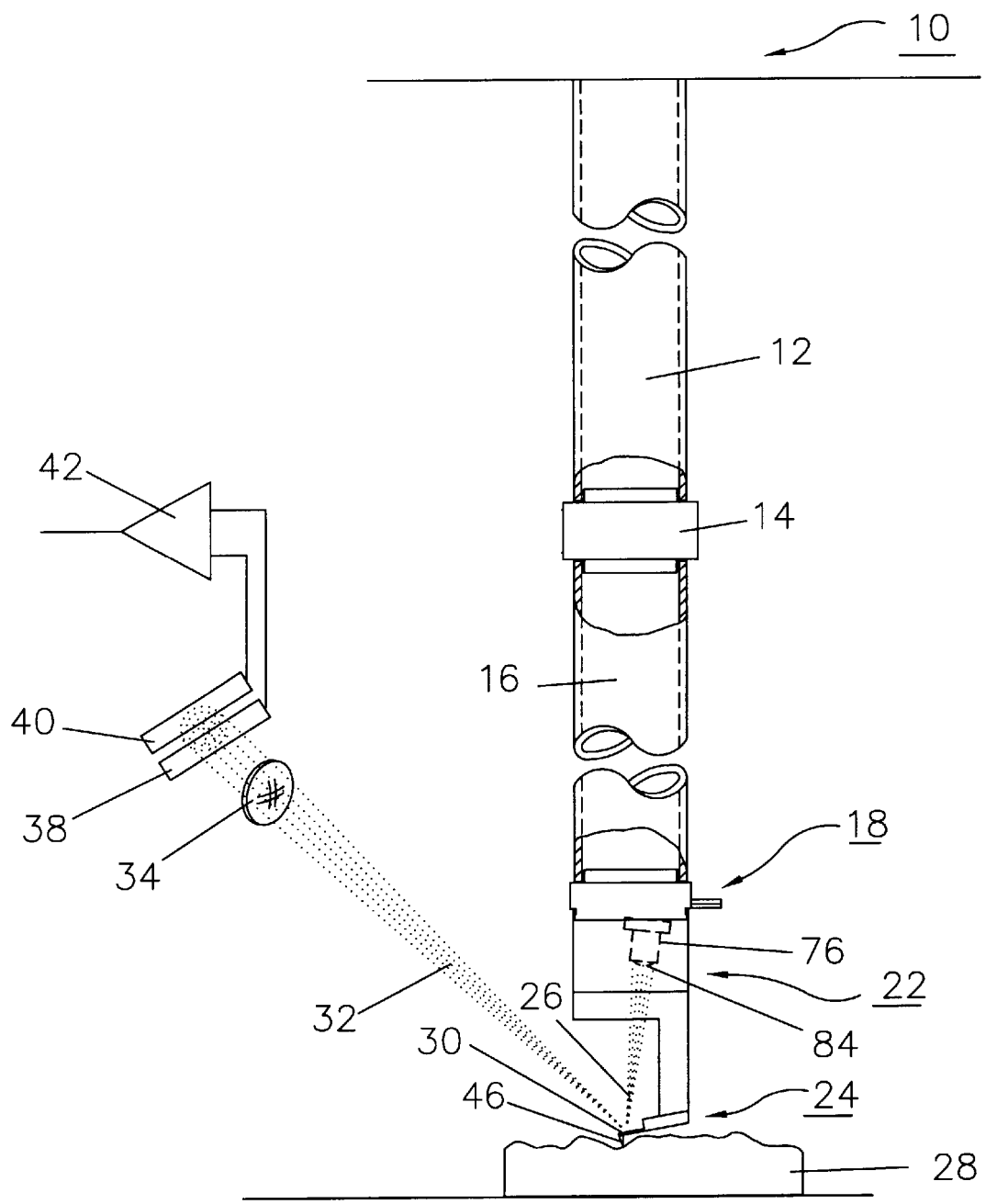
FIG. 1 shows a scanning force microscope system employing a first embodiment of the invention in which a removable probe illuminator assembly is attached to a scanning mechanism by means of a receiver assembly.

FIG. 1 illustrates a preferred embodiment of the invention. A microscope frame 10 supports a lateral driver 12 coupled to a vertical driver 16 by a coupler 14. Vertical driver 16 supports a receiver assembly 18. A removable probe illuminator assembly 22 supports a laser 76 with a laser focusing lens 84 and a probe assembly 24 detailed in FIG. 1A. Probe illuminator assembly 22 is shown in FIG. 2. Laser 76 creates a laser beam 26. Laser beam 26 reflects off of a cantilever 30, which supports a stylus 46, to form a reflected beam 32. Stylus 46 follows the topography of a sample 28. Reflected beam 32 passes through a beam sizing lens 34 and impinges on a first photodiode 38 or a second photodiode 40, or both. A difference amplifier 42 receives the output signals from photodiodes 38 and 40. Beam sizing lens 34 is optional and either increases or decreases the diameter of the beam to a value that matches the light sensitive areas of photodiodes 38 and 40. The focal lengths and positions of lenses 84 and 34 are determined, in a conventional fashion, calculated to sufficient accuracy using the thin lens formula:

$$\frac{1}{f} = \frac{1}{s} + \frac{1}{s'},$$

where $f$ is the focal length of the lens, s is the object distance to the lens, and s' is the desired distance from the lens to the image. The appropriate sign conventions must be followed when making the determinations.

Figure 1A:
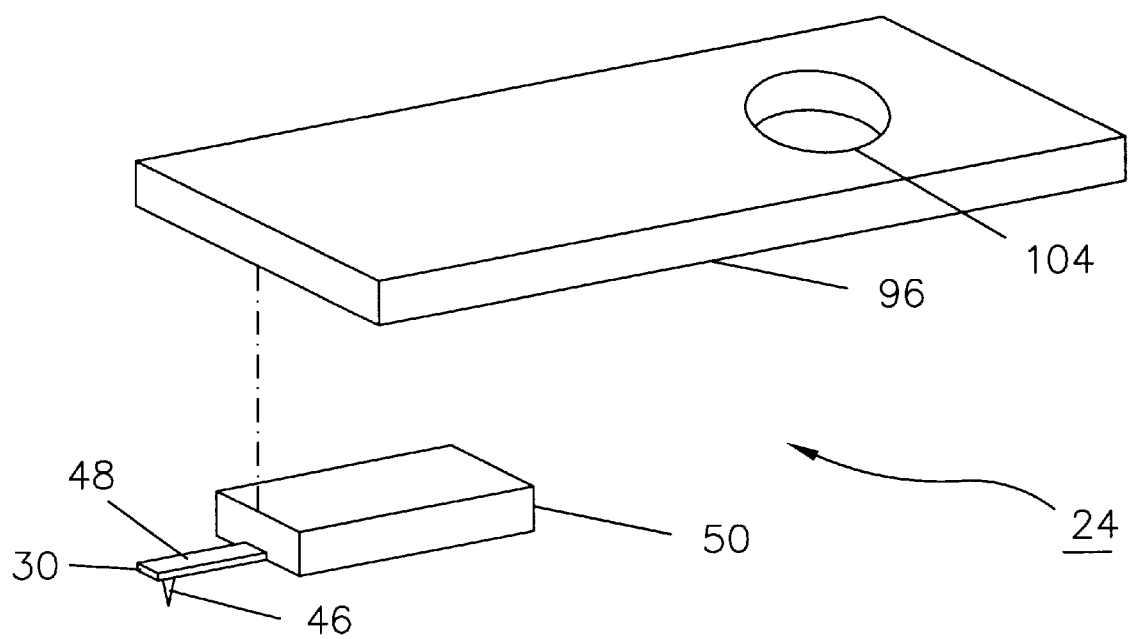
FIG. 1A shows the probe assembly of the FIG. 1 embodiment.
Figure 2:
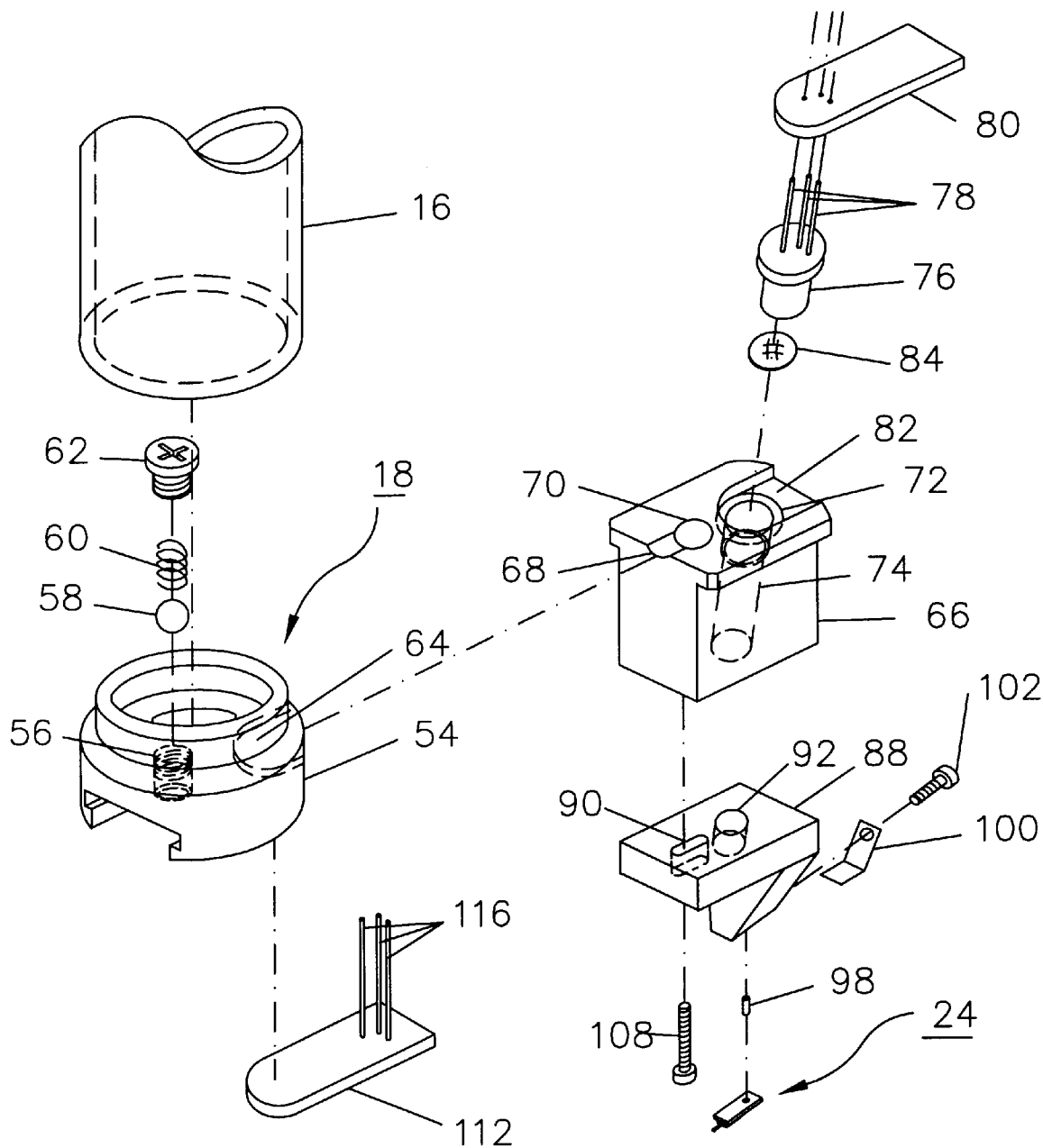
FIG. 2 shows the removable probe illuminator assembly of the FIG. 1 embodiment.

FIG. 1A shows probe assembly 24 with a die 50 which supports cantilever 30. Cantilever 30 has an upper surface 48 which is at least partially reflecting. The cantilever surface opposite surface 48 supports stylus 46. Cantilever 30 has a weak spring constant and will deflect measurably, i.e., ±0.10 Angstrom, with as little as one nanonewton of force applied to stylus 46. Die 50 is attached to a tab 96 with a conventional adhesive (not shown). Tab 96 has a tab alignment hole 104.

FIG. 2 illustrates, in detail, the relationship of vertical driver 16 to receiver assembly 18 and associated parts. Receiver assembly 18 comprises a receiver 54 with a tapered receiver bore 56 that becomes smaller at its lower end. A receiver ball 58 and a receiver spring 60 are held captive in receiver bore 56 by a receiver spring cap 62. A receiver board 112 has three receiver board leads 116 attached. Conventional laser diode assemblies use an internal photodiode to sense the output intensity of the internal laser. Such an assembly requires three electrical leads. One lead provides current to the laser and another lead brings out the signal from the photodiode. A third lead provides a common ground connection for both the laser and the photodiode. Receiver board 112 is attached flush in a receiver groove 64 with adhesive (not shown).

A laser holder 66 has a laser bore 72 which penetrates holder 66 at an angle to its top surface. A laser beam throughbore 74 is smaller than and coaxial with bore 72 and continues through to the lower surface of laser holder 66. The top surface of laser holder 66 has a holder groove 68 and a detent hole 70. Laser 76 is inserted into laser bore 72. Lens 84 may be an integral part of laser 76 or may be mounted in laser holder 66. Laser 76 has laser leads 78. Laser leads 78 are attached to a laser board 80. When laser 76 is inserted into laser bore 72, laser board 80 fits flush into a laser board slot 82.

A probe holder 88 has a through slot 90 through which a probe holder screw 108 is inserted and a probe holder throughbore 92. Probe holder screw 108 screws into laser holder 66 to hold probe holder 88 onto laser holder 66. Probe holder 88 supports a tab pin 98. A tab clamp 100 clamps probe assembly 24 to probe holder 88. Probe assembly 24 is positioned such that tab pin 98 penetrates tab alignment hole 104, as shown in FIG. 1A. A tab clamp screw 102 attaches tab clamp 100 to probe holder 88.

Figure 3:
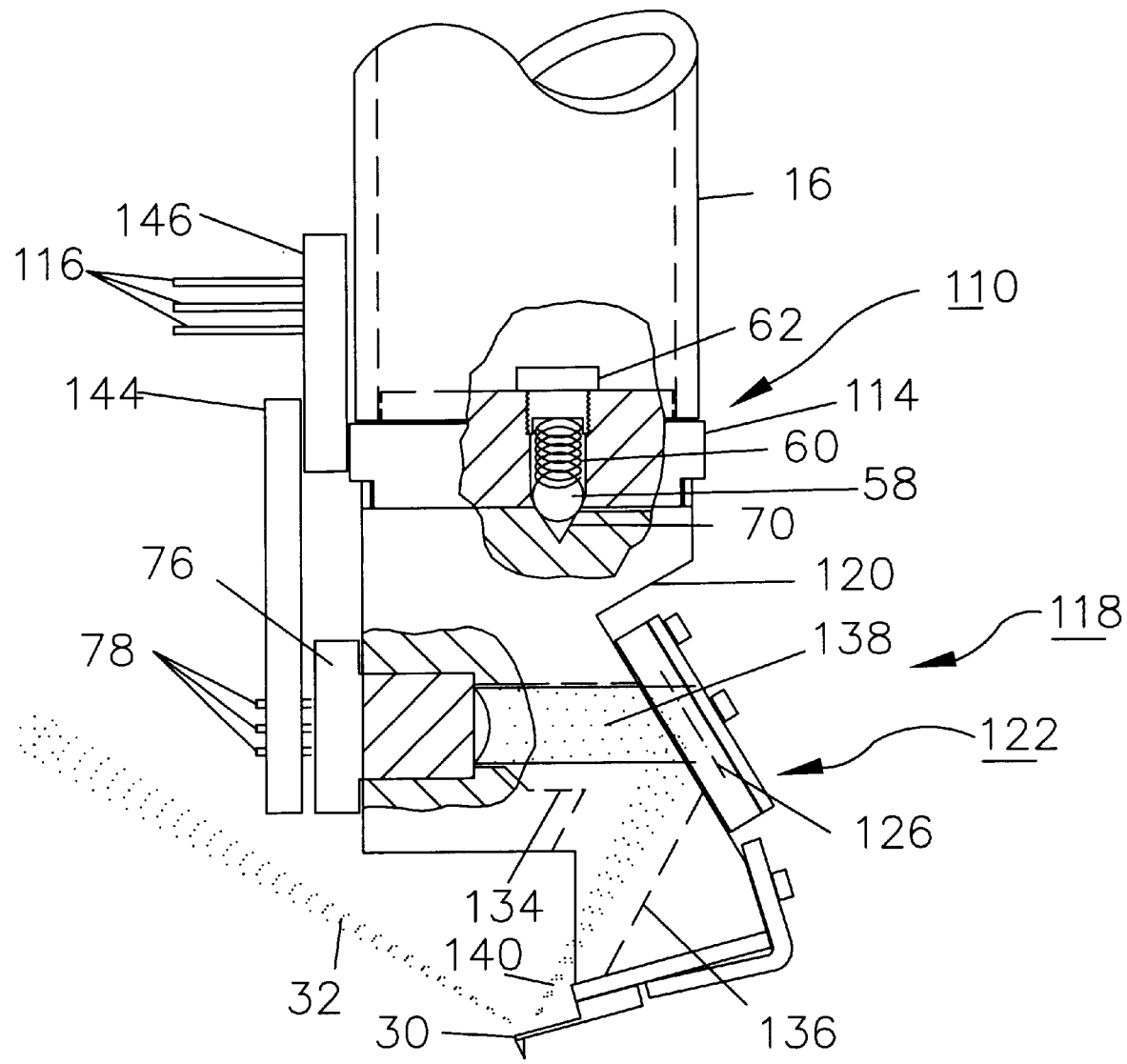
FIG. 3 shows a second, alternate embodiment of a removable probe illuminator assembly.

FIG. 3 illustrates an arrangement of an alternate receiver assembly 110 which receives a laser assembly 118. Assembly 110 is attached to vertical driver 16 and includes an alternate receiver 114 and a receiver vertical board 146 which has receiver board leads 116 to power the laser and convey the photodiode sensor signal. Receiver assembly 110 also contains ball 58, spring 60, and cap 62. Laser assembly 118 has a laser mirror probe holder 120. Holder 120 supports laser 76 which in turn supports a laser vertical board 144 by way of laser leads 78. Holder 120 further has a laser throughbore 134 to allow an emitted beam 138 to pass through holder 120 and impinge on a mirror surface 126. Mirror surface 126 is part of a mirror assembly 122, that is shown in detail in FIG. 3A. A reflected beam segment 140 reflects from mirror surface 126 and passes through a mirror throughbore 136. Reflected beam segment 140 then impinges on cantilever 30 and reflects a second time to form reflected beam 32.

Figure 3A:
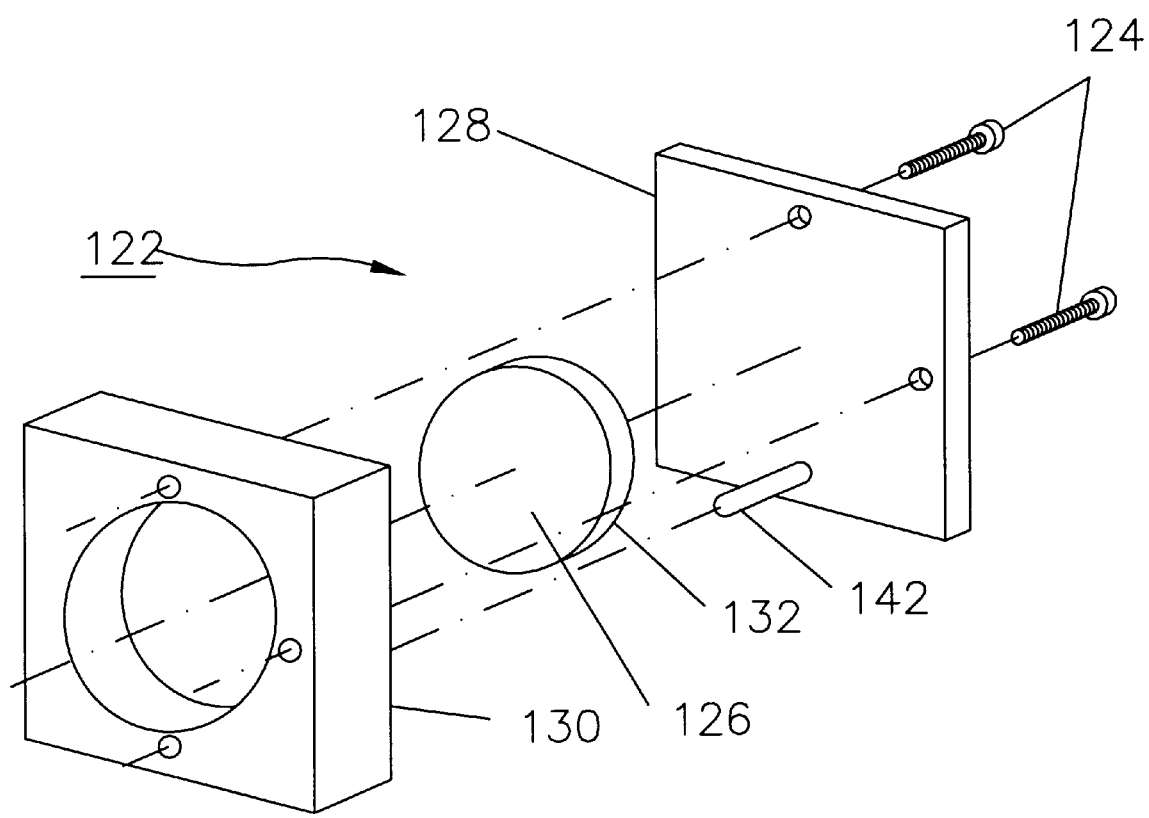
FIG. 3A shows the adjustable mirror assembly of the FIG. 3 embodiment.

FIG. 3A provides the details of mirror assembly 122. A mirror plate 128 has an attached pivot pin 142. A mirror 132 is also attached to plate 128 with an adhesive (not shown). An elastic pad 130 is positioned against plate 128. Assembly 122 is fastened to laser mirror probe holder 120 shown in FIG. 3 by mirror adjustment screws 124.

Figure 4:
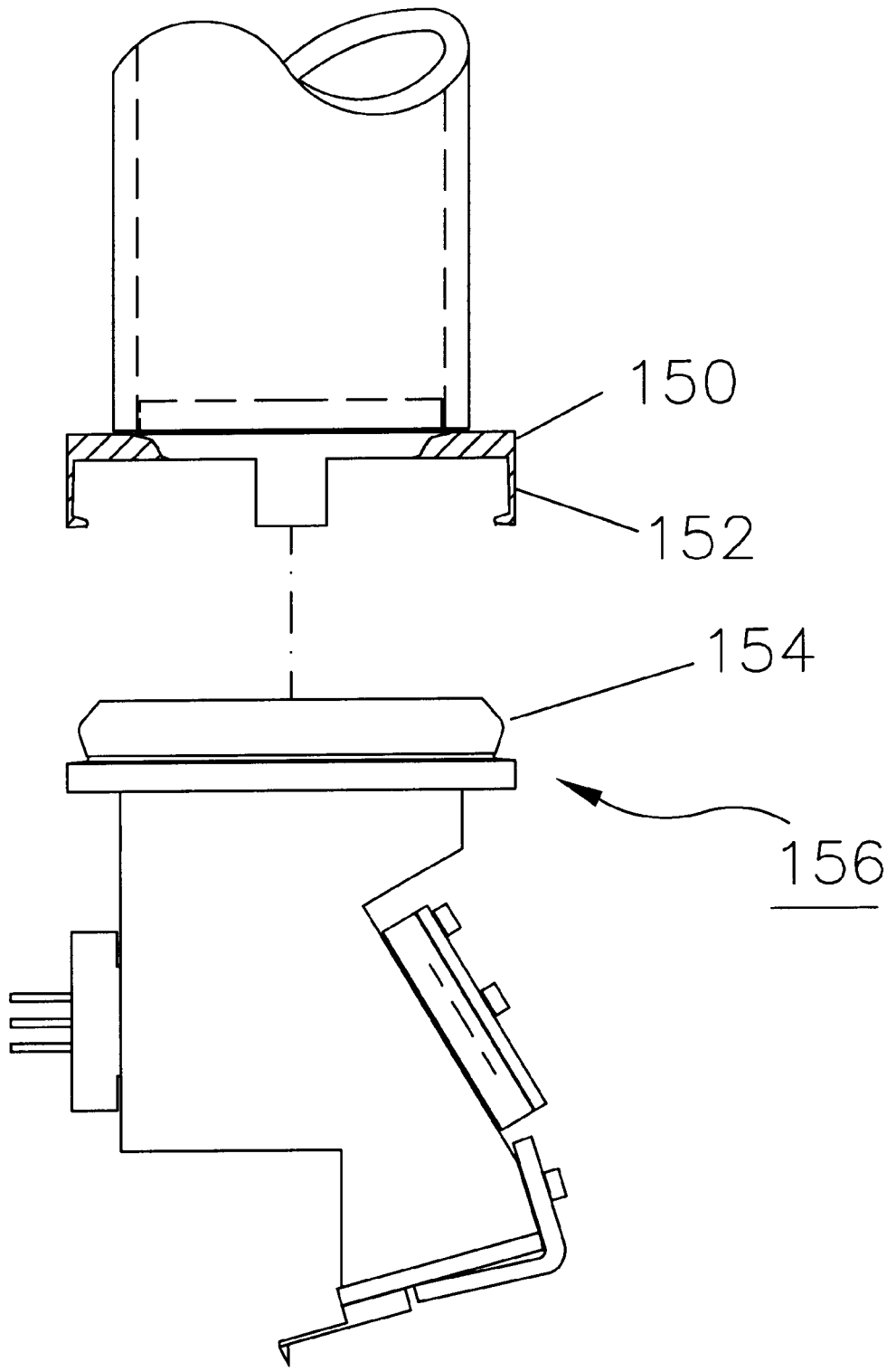
FIG. 4 shows an alternate embodiment insertion connection.

FIG. 4 shows an insertion and extraction device for attachment and detachment. A tang receiver 150 has four tangs 152 located circumferentially around tang receiver 150. A flange assembly 154 has a circular flange 156 around its top surface. Tang receiver 150 is made of a material which provides for elastic displacement of tangs 152, i.e., bending. As flange assembly 154 is pressed against tang receiver 150, tangs 152 displace slightly in a radial direction, i.e., outwardly as shown in FIG. 4, and then spring back in to capture flange assembly 154.

Figure 5:
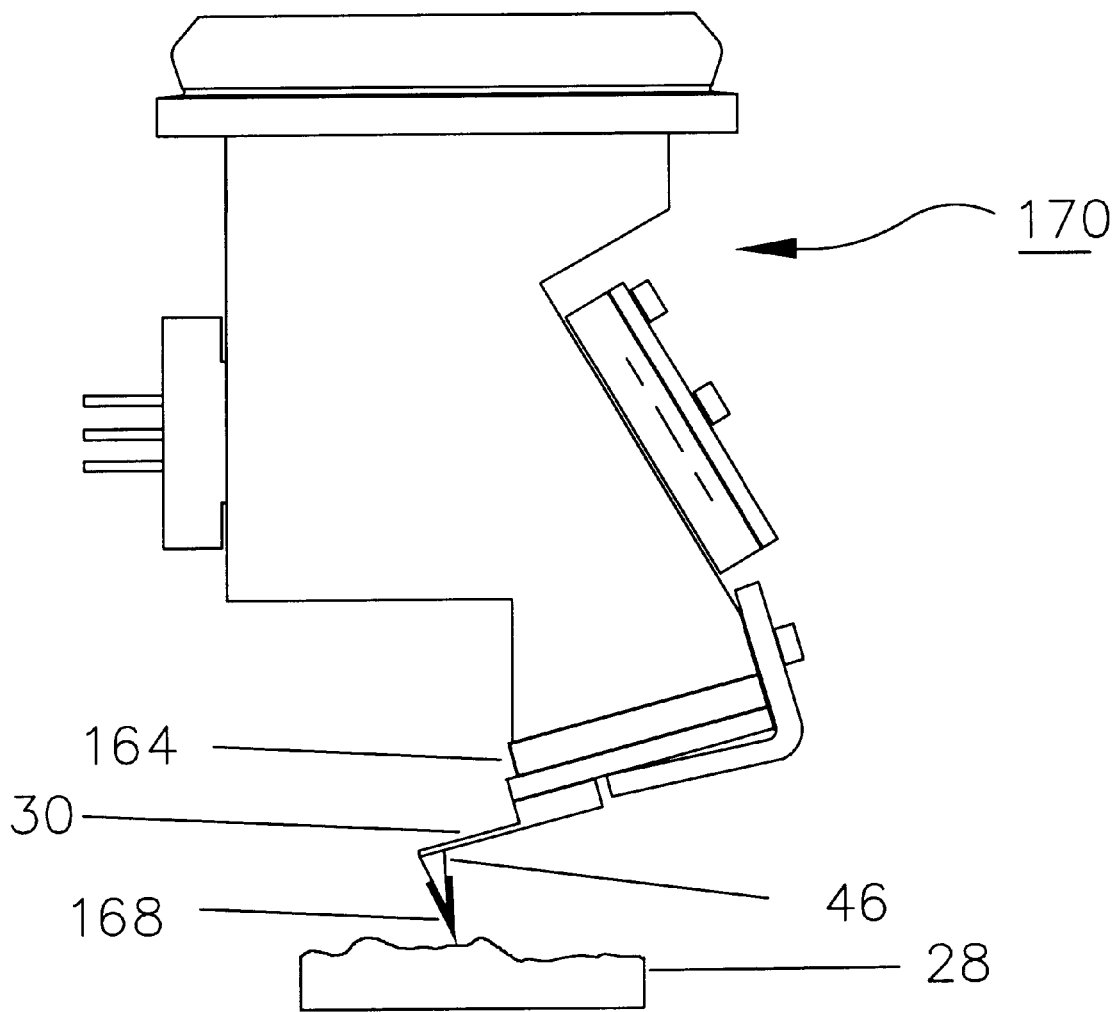
FIG. 5 shows a third, alternate embodiment of a removable probe illuminator assembly, with an oscillator device and a magnetic sensor.

FIG. 5 shows a third alternate probe illuminator assembly 170 that supports a conventional oscillator device 164. Cantilever 30 supports stylus 46. Stylus 46 may be composed of, or coated with, a conventional magnetic sensing material 168. Stylus 46 is disposed on or near sample 28.

Figure 6:
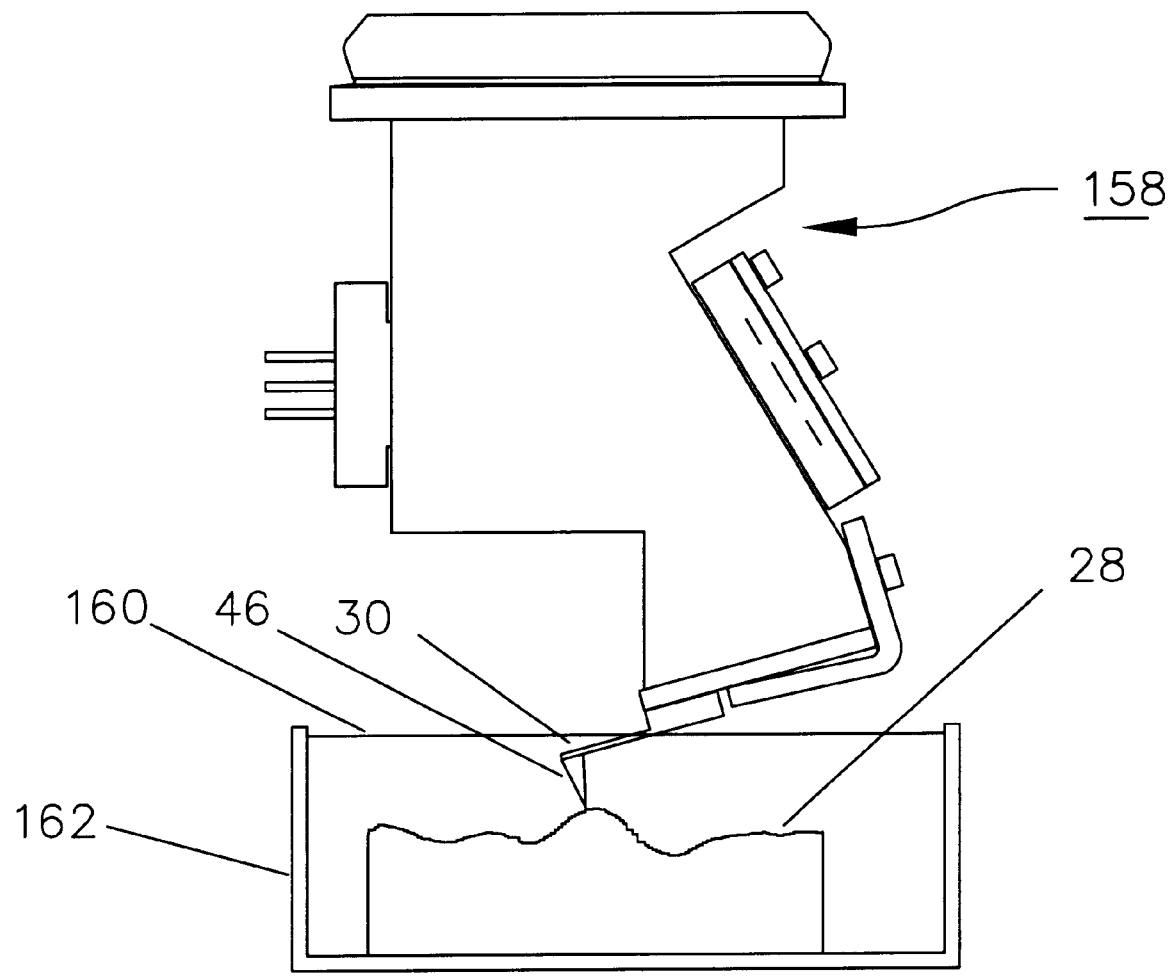
FIG. 6 shows a fourth, alternate embodiment of a removable probe illuminator assembly, with a stylus in fluid.

FIG. 6 shows a fourth alternate probe illuminator assembly 158 with cantilever 30 and a conventional sample and fluid container 162. Container 162 contains a conventional fluid 160 and sample 28.

Figure 7:
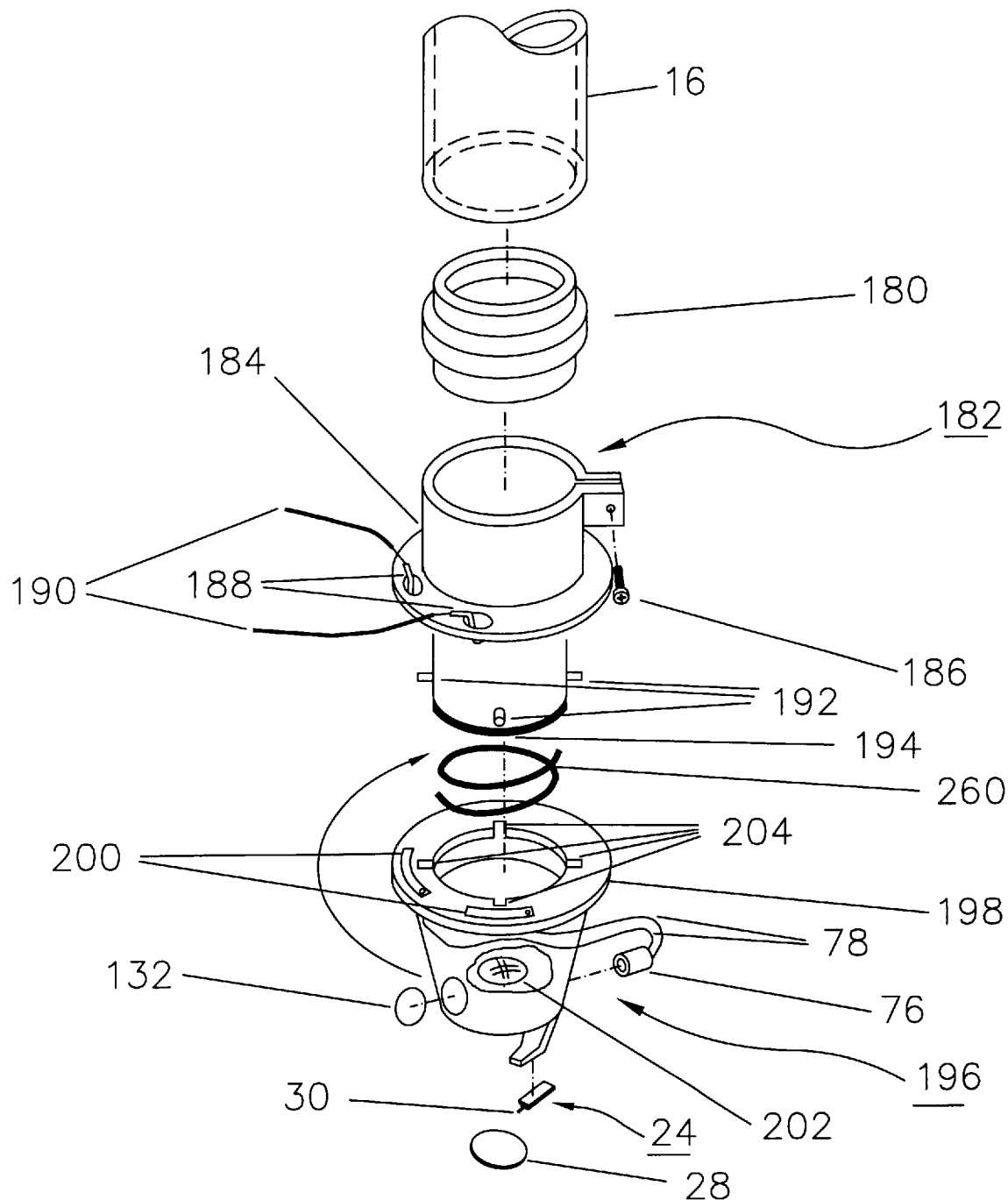
FIG. 7 shows a fifth, alternate embodiment of a removable probe illuminator assembly.

FIG. 7 shows a fifth alternate embodiment of a removable probe illuminator assembly 196 in which a fixed receiver 180 is attached to vertical drive 16, typically with an adhesive (not shown). A second alternate receiver assembly 182 is attached to fixed receiver 180 by clamping second alternate receiver assembly 182 to fixed receiver 180 with a clamp screw 186. Second alternate receiver assembly 182 includes of an adjustable receiver 184, spring contacts 188, electrical power leads, two of which are shown at 190, receiver pins 192, and an elastic pressure ring 194. The elastic pressure ring 194 is a conventional O-ring that is chosen for proper size and elastic properties, i.e., to provide a restoring force to the assembly. The most preferred type is silicon, with viton, and polyurethane O-rings also preferred. The restorative force also may be supplemented with, or supplied entirely by the spring contacts.

The fifth alternate removable probe illuminator assembly 196 is captured by second alternate receiver assembly 182.

Fifth alternate removable probe illuminator assembly 196 mounts an insulator plate 198 with two arcuate electrical contacts 200 and contains grooves 204. Fifth illuminator assembly 196 also has a mounted viewing lens 202, laser 76 with laser leads, two of which are shown at 78, mirror 132, and probe assembly 24 with cantilever 30. Sample 28 is positioned such that cantilever 30 may scan sample 28.

Figure 8:
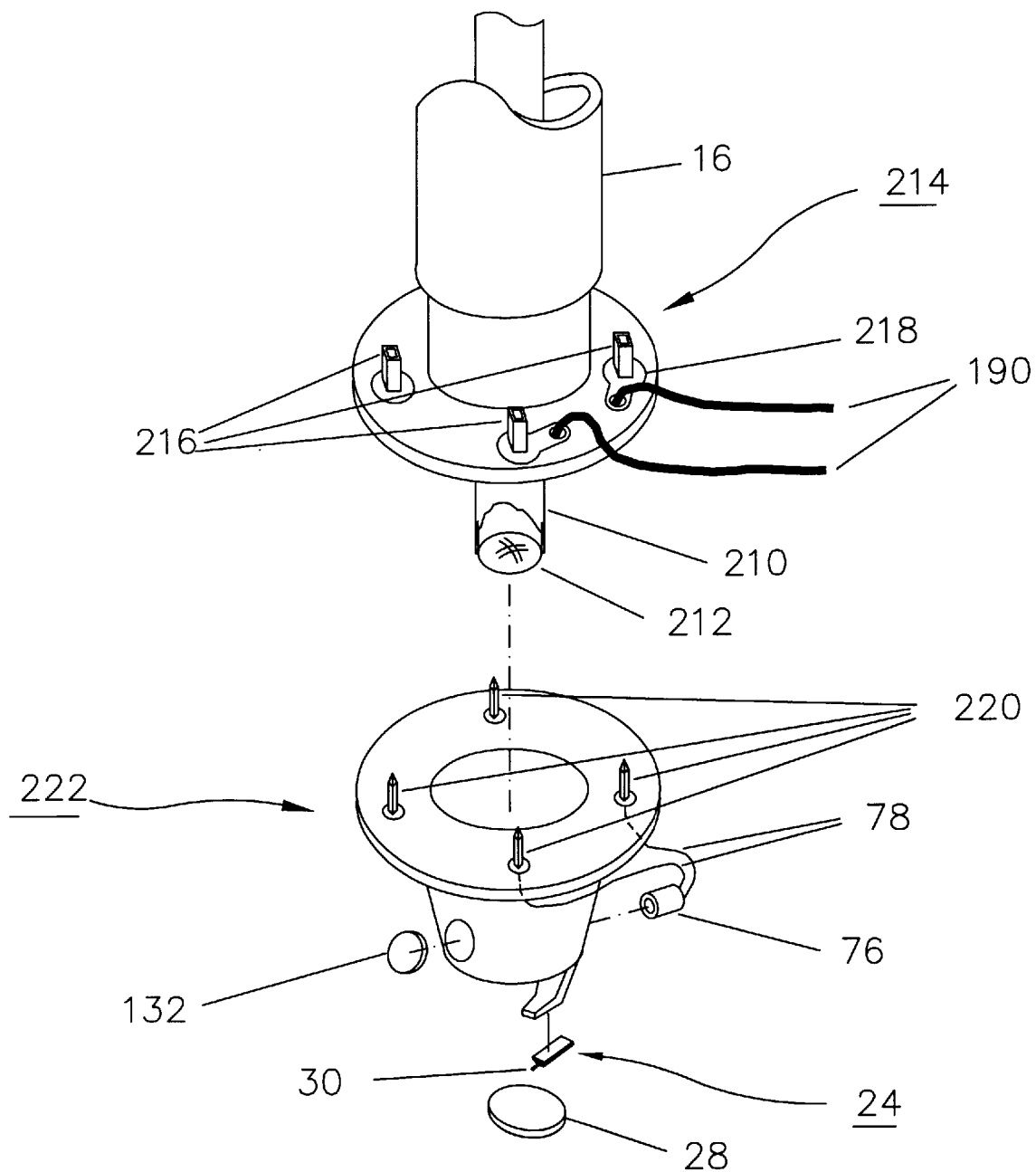
FIG. 8 shows a sixth, alternate embodiment of a removable probe illuminator assembly.

FIG. 8 shows a sixth alternate embodiment of a removable probe illuminator assembly in which a third alternate receiver assembly 214 is attached to vertical driver 16, typically with an adhesive (not shown). Third alternate receiver assembly 214 contains four clips 216 (only three are shown) which are connected to conductor traces 218. Electrical power leads 190 are attached to conductor traces 218, typically with solder (not shown). The sixth alternate removable probe illuminator assembly 222 is captured by third alternate receiver assembly 214. Sixth alternate removable probe illuminator assembly 222 contains four pins 220, laser 76 with leads 78 connected electrically to two of pins 220, mirror 132, and probe assembly 24 with cantilever 30. Sample 28 is positioned such that cantilever 30 may scan sample 28.

Figure 9:
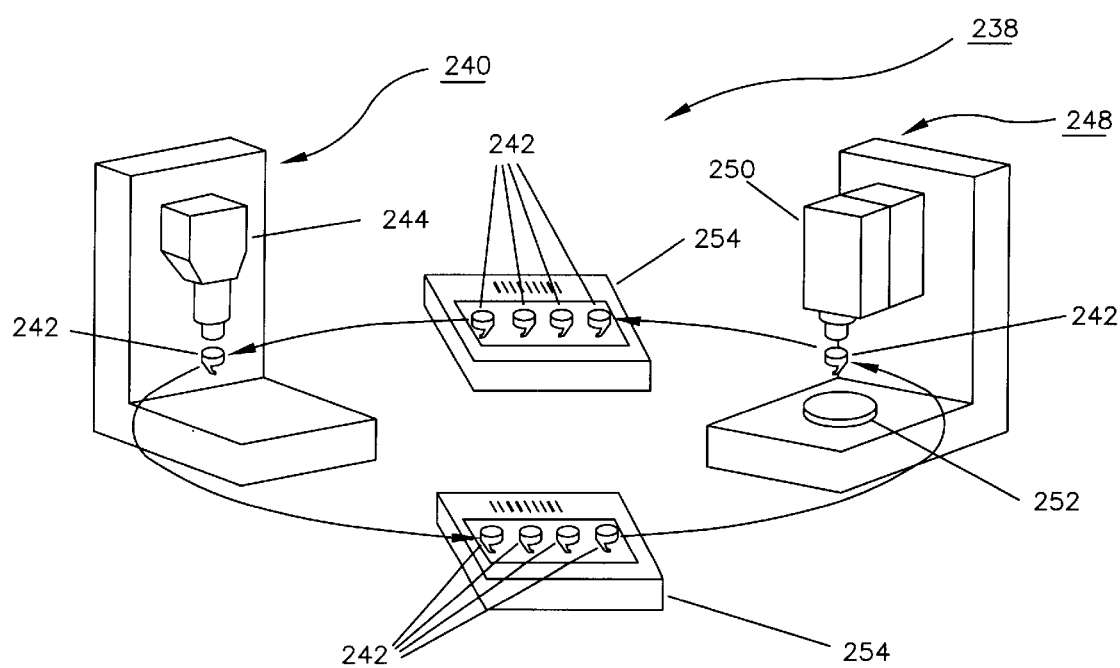
FIG. 9 shows a scanning probe microscope system including a microscope and an adjustment station.

FIG. 9 shows a scanning probe microscope system 238 including a microscope assembly and an adjustment station. Scanning probe microscope assembly 240 contains a scanning probe microscope 244 with a removable probe sensor assembly 242. Removable probe sensor assembly 242 includes a removable probe assembly, as discussed above for example with reference to FIGS. 7 and 8, but not shown in FIG. 9. As will be appreciated by those skilled in this field, the sensor assembly need not include a cantilever, but could include other sensing components. Removable probe sensor assembly holders 254 are shown holding removable probe sensor assemblies 242 for transport to and from adjustment station assembly 248 which holds removable probe sensor assembly 242 and calibrated, characterized sample 252.

OPERATION OF THE INVENTION

The operation of the present scanning force microscope system will be described with reference to FIG. 1. Lateral driver 12 is fixed at the upper end to microscope frame 10, but its lower end can move laterally. All parts attached to the lower end appear to pivot about a point approximately at the midpoint along the length of lateral driver 12. Consequently, coupler 14, vertical driver 16, receiver assembly 18, and removable probe illuminator assembly 22 move laterally. Stylus 46, therefore, moves laterally across the surface of sample 28.

Laser 76 also moves laterally and directs laser beam 26 at cantilever 30. Because laser 76 is in the same moving frame of reference as cantilever 30, laser beam 26 constantly follows the movement of cantilever 30. Focusing lens 84 focuses beam 26 to an approximate point on cantilever 30.

As stylus 46 encounters changing topography, with typical ranges of vertical motion up to seven microns, and in some applications, up to ten microns, during its lateral scan it applies force to cantilever 30 causing minute deflections of cantilever 30. The deflections cause reflected beam 32 to change direction and impinge at different locations on photodiodes 38 and 40 changing their electrical outputs. Conventional difference amplifier 42 then outputs the changes. Difference amplifier 42 output is routed to a conventional feedback signal processor (not shown) and then to conventional vertical driver 16. Vertical driver 16 then expands and contracts along its length in response to the processed electrical signals, thus causing the deflection of cantilever 30 to return to its preset position. Beam sizing lens 34 is optional and increases or decreases the spot size of the beam to a value that matches the size of photodiodes 38 and 40 as necessary.

In accordance with the present invention, each illuminator assembly 22 is adapted and configured so that its location and angular position is substantially the same as in each preceding and each succeeding assembly. Illuminator assembly 22 may be removed with slight rotational moment or tensile force, or both without tools or danger of damage to other parts of the microscope. Thus, the current invention results in fast removal and secure and accurate installation of probe illuminator assembly 22.

When probe assembly 24 is replaced, the new probe assembly must be installed in precise alignment with laser 76. Because probe illuminator assembly 22 is fast, accurately, and securely removable from receiver assembly 18, the alignment may be accomplished with assembly 22 removed from the entire microscope. Because the probe illuminator assembly is removed from the microscope, alignment of the beam in its x-y plane may be facilitated by conventional jigs and tools as known in this field. Complete illuminator assemblies are relatively inexpensive, and when one is removed it may be replaced from a set of prepared illuminator assemblies that have already been aligned. The removed assembly may then be recycled and refitted with a new probe assembly as described above.

Referring to FIG. 2, the operation of receiver assembly 18 and removable probe illuminator assembly 22 will be described. Assembly 22 contains laser holder 66. Laser holder 66 slides laterally into receiver 54. When holder 66 is in position in receiver 54, the force from receiver spring 60 presses receiver ball 58 into detent hole 70. Laser holder 66 is then held gently but finely to receiver 54. A slight lateral force in a direction along the axis of laser holder groove 68 will release assembly 22 from receiver assembly 18. Laser board 80 and receiver board 112 make electrical contact and provide power to laser 76 via laser leads 78 and receiver board leads 116.

In order to provide precise alignment of laser 76 and probe assembly 24, assembly 24 is mounted to probe holder 88 by way of probe holder screw 108 and slot 90. By loosening screw 108, probe holder 88 moves laterally with reference to laser holder 66 in the direction of slot 90 and pivots around screw 108. This procedure is accomplished while assembly 22 is removed from the microscope.

Probe assembly 24 is conveniently removed from probe holder 88 by applying slight pressure to tab 100 and slipping probe assembly 24 off tab pin 98.

With reference to FIG. 3, the operation of alternate removable probe illuminator assembly will be explained. Holder 120 slides laterally into alternate receiver assembly 110 in much the same manner as in FIG. 2, except that holder 120 slides into receiver assembly 110 from left to right. Again, receiver ball 58 presses into detent hole 70 allowing laser assembly 118 to be installed and removed with slight lateral pressure.

In this alternate assembly, laser 76 is aligned in a lateral direction, such that emitted beam 138 impinges on mirror surface 126, and results in reflected beam segment 140. The angle of mirror surface 126 can be changed to redirect beam segment 140 onto cantilever 30 as in FIG. 3.

A source of electrical power (not shown) is connected to receiver board leads 116. As assembly 118 slides into receiver assembly 110, laser vertical board 144 presses against receiver vertical board 146 making electrical contact between laser leads 78 and receiver board leads 116. This connection provides electrical power to laser 76.

With reference to FIG. 3A, adjustment of the angle of mirror surface 126 will be described. Elastic pad 130 is sandwiched between mirror plate 128 and holder 120. Mirror plate 128 compresses elastic pad 130 when screws 124 are tightened. Consequently, mirror 132 will rotate about the point where the end of pivot pin 142 and holder 120 meet.

Referring to FIG. 5, oscillator device 164 causes stylus 46 to vibrate and periodically approach and withdraw from sample 28 in a conventional manner. Magnetic sensing material 168 senses any magnetic fields emanating from sample 28. The interaction of sensing material 168 and any magnetic fields from sample 28 causes cantilever 30 to deflect.

Referring to FIG. 6, sample 28 is submersed in conventional fluid 160. Both sample 28 and fluid 160 are contained in fluid container 162. Alternate probe illuminator assembly 158 is positioned such that cantilever 30 and stylus 46 are submersed in fluid 160 in a conventional manner.

Referring to FIG. 7, the free end of vertical drive 16 has fixed receiver 180 attached with an adhesive. Receiver assembly 182 can then be adjusted either in rotation or in the vertical direction, or both before being clamped to fixed receiver 180. Fifth alternate removable probe illuminator assembly 196 is removably captured by receiver assembly 182 with a bayonet connection, i.e., by aligning grooves 204 with pins 192, inserting assembly 196 onto receiver 182 and rotating assembly 196 to a detent position. Elastic pressure ring 194 deforms against the interior of assembly 196 and applies force on pins 192 to hold assembly 196 and receiver 182 together. Alternate spring 260 is used in lieu of elastic pressure ring 194 to force pins 192 against the interior of assembly 196. This positions assembly 196 and receiver 182 relative to each other.

Spring contacts 188 bend and are forced against arcuate contacts 200. Thus, electrical current may now flow through electrical power leads 190, spring contacts 188, arcuate contacts 200, and laser leads 78 to power laser 76. Laser 76 produces a light beam (not shown) which is reflected off mirror 132 and onto cantilever 30.

A viewing lens 202 is mounted in a convenient location in removable probe illuminator assembly 196 and is used to make optical observations of either cantilever 30 or sample 28, or both.

Referring to FIG. 8, the free end of vertical drive 16 has third alternate receiver assembly 214 attached with an adhesive (not shown). Sixth alternate removable probe illuminator assembly 222 is rotated such that conventional pins 220 are aligned with conventional clips 216. Assembly 222 is then moved against receiver assembly 214 such that pins 220 penetrate clips 216 and illuminator assembly 222 is captured by receiver assembly 214 and held in place by frictional forces between pins 220 and clips 216. Clips 216 are electrically connected to electrical power leads 190 by conductor traces 218. Clips 216 make electrical contact with pins 220 which are in turn electrically connected to laser leads 78. Thus, electrical current may flow through power leads 190, traces 218, pins 220, and leads 78 to power laser 76. Laser 76 produces a light beam (not shown) which is reflected off mirror 132 and onto cantilever 30.

Alternate viewing support tube 210 supports viewing lens 212 and is inserted through vertical driver 16, third alternate receiver assembly 214, and into sixth alternate removable probe illuminator assembly 222. In this way, viewing lens 212 is placed in position to visually observe either cantilever 30 or sample 28, or both.

Referring to FIG. 9, scanning probe microscope assembly 240 supports scanning probe microscope 244. Removable probe sensor assembly 242 typically includes a housing made of lightweight material, such as aluminum or plastic. The housing of assembly 242 is often shaped in the form of a cylinder, typically with a diameters of less than 30 millimeters and with a pylon to capture and hold a probe assembly in a position that allows the probe unrestricted access to a sample surface. Removable probe sensor assembly 242 may be removed or attached to microscope 244 with any of the methods described earlier. Probe sensor assembly 242 may be removed for renovation, repair, calibration, or replacement with a new assembly 242. Removed assemblies 242 may then be placed in removable probe sensor assembly holder 254. Holder 254 is then use to transport sensor assemblies 242 to adjustment station 250 where sensor assemblies 242 may be mounted to station 250 and repaired or calibrated. After either new or reconditioned sensor assemblies 242 have been deemed acceptable for use, they may then be transported to scanning probe microscope 244 either singly or in groups in holder 254 for attachment to microscope 244.

Removable probe sensor assembly 242 may include a laser (not shown), a cantilever (not shown), and optical devices (not shown). These components may be configured in any of the embodiments described earlier and to form removable probe illuminator assembly 22 (shown in FIG. 1) for a scanning force microscope. However, removable probe sensor assembly 242 may alternately include a pointed conductor (not shown) to form a removable probe sensor assembly 242 for a scanning tunneling microscope, for example, other alternate embodiments of the removable probe sensor assembly 242 may include a thermal sensor, a capacitance sensor, a magnetic sensor, or a near-field photon sensor (not shown). Thermal sensors may use thermocouples, thermal sensitive resistance elements, or thermal sensitive semiconductor elements. As is known, near-field scanning microscopes may use photon sensors and emitters coupled to optical fibers or other transparent plastics and glasses that may be drawn or tapered into small solid or hollow points. In each of these embodiments of a scanning probe microscope, various conventional support devices, including miniaturized electronic support circuits, signal generators, or photon generators (not shown) may be included in the removable probe sensor assembly 242. The invention described here permits replacement and realignment of the constituent parts of removable probe sensor assembly 242 to be accomplished off line, at adjustment station 248, thus allowing scanning probe microscope 244 to continue in service while spare, removable probe sensor assemblies 242 are under repair or realignment at station 248.

Adjustment module 250 may contain either laser or incandescent light sources. Adjustment module 250 may contain a variety of circuits including amplifiers, analog to digital converters, digital to analog converters, and amplitude and phase detection circuits (not shown). Such circuits may further contain electronic and sensing devices including photodiode or phototransistor receivers (not shown) for detecting and determining the reflected angle and intensity of any light emanating from assembly 242. In addition, adjustment module 250 may include mechanical devices, such as gear assemblies, rotary or linear motors, piezoelectric, electrostrictive, or electromagnetic devices (all not shown), for the actual adjustment of assemblies 242 or to create raster motion of assemblies 242 over calibrated sample 252. Any probe components that are part of assembly 242 may be characterized resulting in the rejection or acceptance of assembly 242.

ADVANTAGES OF THE PRESENT INVENTION

The scanning force microscope system of the present invention permits attachment of the probe illuminator assembly to the moving portion of the scanning mechanism and provides easy installation on, and removal from, the microscope. The cantilever can then be replaced on the removed assembly without damaging, stressing or contaminating the lateral or vertical drive mechanisms. The laser beam can also be conveniently aligned while the assembly is removed from the microscope thereby avoiding damage to the lateral or vertical drive mechanisms. After installation of the prealigned probe illuminator assembly on the microscope, the light beam accurately tracks the motion of the cantilever as it scans over the surface of the sample. Further, the use of low mass components in the probe illuminator assembly reduces the mass of the moving elements, enabling the system to scan at a faster rate.

The connection mechanism for the probe illuminator assembly may be made as shown above using a lateral or vertical slide connection and operation. Connection may also be made by lateral or vertical insertion or by a combination of sliding and rotating or insertion and rotation.

The scanning mechanism can take many forms. The vertical and lateral drivers can be piezoelectric blocks, stacks, tubes, bimorphs, or flexures. Piezoelectric devices can actuate the vertical and lateral drivers. Magnetic or magnetostrictive devices can also be used as such drivers. The vertical and lateral drivers can be combined into a single piezoelectric tube which can create relative motion in the x, y, and z direction with respect to the sample surface.

The light source can be a laser, a light emitting diode, or an incandescent source. The examples show the reflected beam location detectors as photodiodes, but other types of known devices that can detect light may be used in the present invention. For example, the light detecting devices can be phototransistors. If an array of four or more light detecting devices is employed, the lateral motion of the beam as well as the vertical motion can be determined.

It is possible to mount a detector array of photodiodes in the removable probe illuminator assembly. Light weight detector arrays such as the Centrovision, Inc. (Newbury Park, Calif.) QD7-0 quad photodiode are suitable for such mounting. These associated light sensitive devices, as mounted to the probe illuminator, receive the light beam reflected from the cantilever during operation. The probe assembly may then be removed from the microscope to facilitate adjustment of the position of the light beam, such that there is no need for alignment of a fixed detector assembly after installation of the probe illuminator assembly into the microscope. This arrangement also eliminates the slight error in the detector signal caused by relative lateral movement between the detector and the fixed probe illuminator assembly. The added detector array would slightly increase the mass of the moving portion of the microscope, but not enough to degrade operation. Electrical signals for detectors mounted in the removable probe illuminator assembly can be routed through contacts similar to those described for providing electrical power to the light source, as will be understood by one of ordinary skill in this field.

The scanning force microscope system of the present invention can operate with the sample submerged in fluids. Further, the microscope can operate by oscillating the cantilever and detecting some parameter of the oscillation, such as the amplitude, frequency, or phase change. The oscillating cantilever may actually come into intermittent contact with the sample surface.

In the examples, a stylus creates a bending action of the cantilever. However, other types of probes, such as magnetic probes, can bend the cantilever.

Many types of scanning probe microscopes can be constructed such that the probe and associated detection features of the present invention can be incorporated. In such microscopes, an assembly of the present invention may need either to be calibrated or modified or both, without departing from the inventive features of the present invention, as will be understood by one skilled in this art The scanning probe microscope system for probe sensor assembly removal and characterization, of the present invention, may be used with various types of microscopes within the field of the invention.

Thus, the scope of the invention is to be determined by the appended claims, and their legal equivalents, rather than by the examples given.

I claim:

1. A scanning probe microscope comprising:
    a removable probe illuminator assembly including a probe assembly and a beam source; and
    a scanning assembly adapted to provide lateral motion and vertical motion of said probe assembly relative to a sample;
    said probe illuminator assembly adapted to be removably attached to said microscope in a predetermined position relative to the scanning assembly.

2. The scanning probe microscope of claim 1 wherein said probe assembly and said beam source are pre-aligned.

3. The scanning probe microscope of claim 1 further including
    said probe illuminator assembly being adapted to be rotatably and removably attached.

4. The scanning probe microscope of claim 1 further including
    a receiver disposed on the microscope between the scanning assembly and the probe illuminator assembly.

5. The scanning probe microscope of claim 1 further including
    a stylus positioned on a cantilever.

6. The scanning probe microscope of claim 1 further including
    a magnetic field sensor positioned on a cantilever.

7. The scanning probe microscope of claim 1 wherein the scanning assembly includes at least one piezoelectric tube.

8. The scanning probe microscope of claim 1 further including
    an oscillator operatively connected to the microscope and adapted to oscillate a cantilever.

9. The scanning probe microscope of claim 1 further including
    a viewing lens adapted to permit optical observations of either a cantilever or the sample to be observed.

10. The scanning probe microscope of claim 9 wherein the viewing lens is a gradient index lens.

11. The scanning probe microscope of claim 1 further including
    a first receiver member fixedly attached to said scanning assembly and adapted for connection to a second receiver member;
    said second receiver member adapted for adjustment relative to said first receiver member, and adapted for connection to said removable probe assembly.

12. The scanning probe microscope of claim 11 further including electrical contacts positioned on said second receiver member and adapted to provide power to said beam source.

13. The scanning probe microscope of claim 11 further including at least one detent adapted to provide for a fixed position of said removable probe assembly relative to said scanning assembly.

14. The scanning probe microscope of claim 11 further including a deformable member positioned between said second receiver member and said removable probe assembly, and adapted to assist in maintaining said second receiver member in fixed position relative to said probe assembly; said deformable member comprising an elastomer or a spring.

15. The scanning probe microscope of claim 11 further including a plurality of grooves and pins positioned on said second receiver member and said removable probe assembly and adapted to assist in maintaining said probe assembly in fixed relationship relative to said second receiver member:
    each probe illuminator assembly adapted to be removably attached to said scanning assembly while maintaining said beam source focused on said region; and
    a probe illuminator calibration assembly adapted for focusing said beam source to said predetermined region.

* * * * *